Dec. 21, 1965  E. PLUMAT  3,224,855
PROCESS AND FURNACE FOR MELTING AND
WORKING PRODUCTS SUCH AS GLASS
Filed Nov. 14, 1961  2 Sheets-Sheet 1
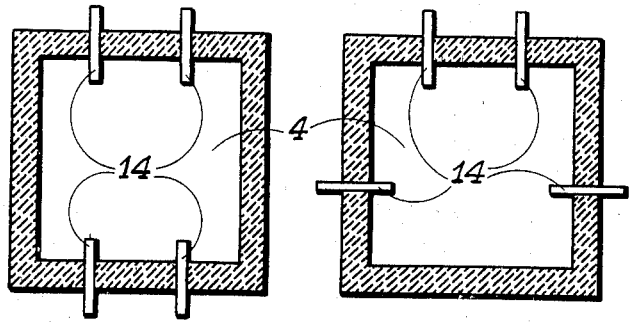
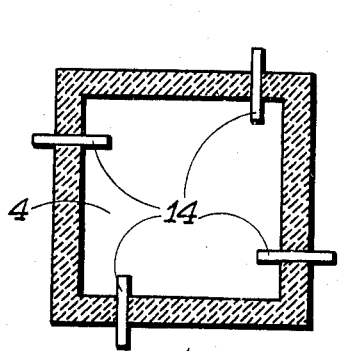
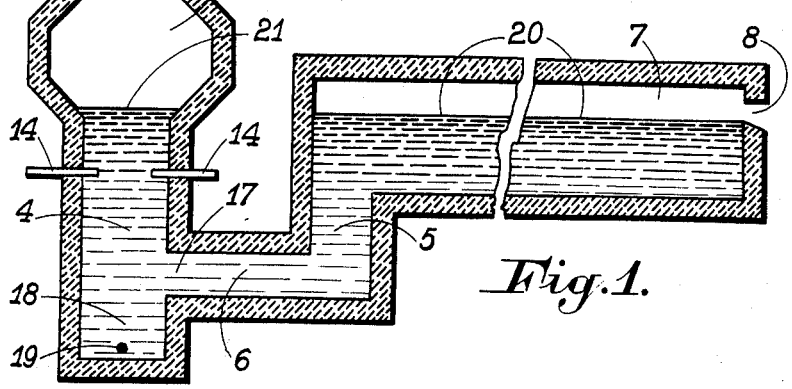
INVENTOR
EMILE PLUMAT
BY
Corey, Hart + Stemple
ATTORNEYS

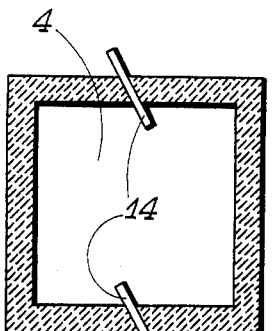
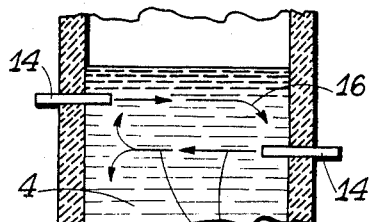
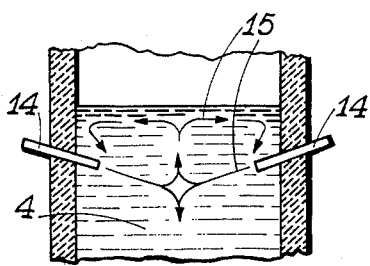
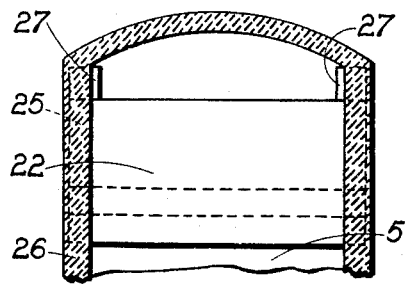
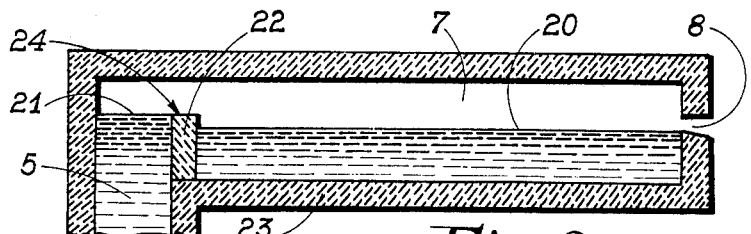
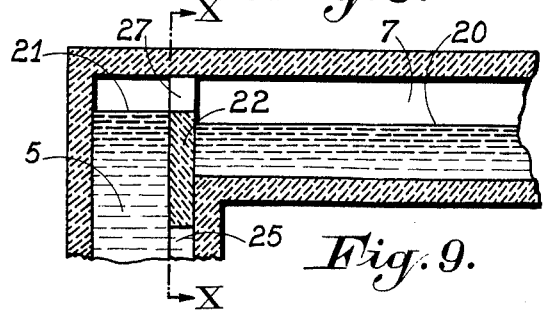

United States Patent Office 3,224,855
Patented Dec. 21, 1965

3,224,855
PROCESS AND FURNACE FOR MELTING AND
WORKING PRODUCTS SUCH AS GLASS
Emile Plumat, Gilly, Belgium, assignor to S. A. Glaverbel,
Brussels, Belgium, a company of Belgium
Filed Nov. 14, 1961, Ser. No. 152,348
Claims priority, application Belgium, Nov. 28, 1960,
475,203, Patent 597,564
7 Claims. (Cl. 65—135)

The present invention relates to a process and to a furnace for melting and working products such as glass, in which process the heat necessary for melting the starting materials is supplied thereto by means of burning gases injected into the molten materials. By "products such as glass" are meant in the following in addition to glass, enamels, basalts, silicates and, in general, all products which exhibit the phenomenon of pasty fusion at a temperature higher than normal temperature.

The furnaces generally employed for working these products have considerable disadvantages. The heat is supplied to the materials to be worked by circulating the flames and the burnt gases on the surface of the molten materials, so that the transmission of heat is very bad owing to the very poor thermal conductivity of the molten products. The convection currents are retarded because the supply of heat takes place at the hottest part of the bath. Consequently, in the first place, it is necessary to provide large exchange surfaces between the molten materials and the burnt gases, that is to say, to construct very huge furnaces, which are therefore costly and are attended by considerable heat losses. Another consequence is that the fumes leave the furnace at a very high temperature. Their sensible heat is recovered in recuperators which are very bulky and which further increase the already high cost of the furnaces.

Methods are known in which the flames are injected through the base of the crucible and rise through the molten products.

According to the present invention, the burning gases are blown in laterally at at least one point and to an adjustable depth into the molten materials. It has been found that it is possible to effect a complete heat transfer between the burning gases and the materials in the course of melting by injecting the gases to a relatively small depth below the surface of the molten materials. The crucible in which the heat transfer and the melting take place is divided into two zones. In the upper zone, in which the heating and the melting of the materials take place, a strong turbulence and homogenisation of the molten materials are effected by the injection of the gases. The zone situated below the injection level of the gases is relatively calm and the working of the product can continue therein.

In accordance with the invention, the molten materials are laterally discharged from the crucible, and preferably the extraction of the molten materials is effected at a level substantially below that at which the injection of the gases takes place. The materials are thus allowed to remain for some time in a calm zone of the crucible in order to complete the working of the product. Simultaneously, there is effected in this calm zone a more complete elimination of the gases contained in the molten products and a decantation of the unmelted materials.

The burning gases are blown into the molten materials at one or more levels and in different directions, which may be variable. By these means, currents of molten materials are produced, which will be appropriately chosen with a view to recirculating the materials undergoing melting and to maintaining them in the heating zone during the melting. The characteristics of these currents are varied by varying the directions, positions and rates of flow of the injected gases. The currents also have a homogenising effect on the molten mass by continuously mixing the materials undergoing melting. Although it is possible to inject the gases at a single level into the molten materials, it is also possible to blow them in at a number of levels. Advantageously, the gases are injected at the lowest level at at least one point close to the point of discharge of the materials from the crucible. Insufficiently melted or worked materials are thus prevented from too rapidly leaving the crucible, for example because they would be carried along by a current descending along a wall. The gases injected close to the point of discharge of the molten materials recirculate the materials rapidly descending towards the point of extraction and simultaneously subject them to a further heating, which ensures that they are melted.

The depth to which the gases are introduced into the molten materials is preferably adjusted by varying the level of the molten materials in the crucible. The level of the molten materials in the crucible may be generally adjusted by adapting the speed of extraction of these materials to the speed of supply of the starting materials. However, the level of the molten materials in the crucible is advantageously adjusted with the aid of an overflow over which the molten materials must pass in order to reach the working zone or a separate refining zone of the melting or working crucible. If desired, the overflow is vertically adjustable. By this means, it is possible to modify the level of the molten materials in the crucible and therefore the depth of injection of the burning gases into the materials while the furnace is in operation. For example, the level of the molten materials will be so adjusted as to effect a complete transfer of heat between the gases and the molten materials, by adapting the depth of injection to the rate of flow of materials to be melted.

A furnace according to the invention comprises a crucible containing the molten materials, provided with at least one nozzle for the injection of burning gases which extends through a lateral wall of the crucible, and a means for adjusting the depth of injection of these gases into the molten materials. According to the present invention, the burner or burners are laterally disposed in the crucible at a relatively small depth below the surface of the molten products. By disposing the burners laterally, there are formed in the crucible two zones situated one above the burners and the other below the burners. In the upper zone, the heat transfer takes place between the burnt gases and the molten products. This transfer is accelerated by the high turbulence obtaining in the crucible as a result of the passage of the gases through the mass of molten materials. On the other hand, the zone situated below the burners is a calm zone in which the working of the products is continued.

The injection nozzles may be disposed in a common plane, but in some cases it is more advantageous to dispose them in different planes. In a preferred arrangement, a nozzle situated in the lowermost plane is disposed close to the point of discharge of the materials, so that the gases injected by this nozzle recirculate through the crucible the materials which tend to descend toward the discharge point and prevent the materials from leaving the crucible without having been sufficiently melted or worked. In accordance with further embodiments, the nozzles are downwardly or upwardly inclined or directed obliquely in relation to the wall or to the tangent to the wall. Currents of materials are thus produced in the crucible which improve the homogeneity of the product and promote the working thereof, and in particular currents are set up which prevent the fresh materials from being directed immediately to the point of discharge of the products from the crucible.

A furnace according to the invention also comprises a channel for the discharge of the molten materials, which is situated below the level of the gas injection nozzles. Although the channel may be disposed at the level immediately below that of the lowest burner, it is preferably disposed substantially lower, so that that portion of the crucible which is situated between the nozzles and the passage for the discharge of the molten materials contains molten materials whose working is continued in a relatively calm zone. The discharge channel advantageously comprises an overflow, which is preferably vertically movable. The said overflow blocks the discharge channel in such manner that the level at which the overflow takes place adjusts the level of the molten materials in the crucible.

Advantageously, the crucible is extended below the point of discharge of the products in order to create a zone for the collection of the decanted materials. The denser materials decant in the working zone and collect in the bottom of the crucible. By extending the crucible downwards, obstruction of the discharge channel by the accumulations of decanted materials is prevented, and at the same time these materials are withdrawn from the circuit of the products undergoing working, and contamination of the products undergoing working by foreign materials is prevented. Heating means, preferably of electrical form, are advantageously disposed in the extension of the crucible in order to prevent setting of the products situated therein.

The upper portion of the crucible is preferably flared. In this way, the speed of the gases leaving the molten materials is reduced as compared with what it would be if the crucible were of uniform cross-section through its height. Thus, the possibility of the materials being carried along by the gases is reduced. In addition, overflowing of molten materials from the crucible is arrested by a zone for the expansion of the material above the crucible. Overflow may be caused, for example, by an accumulation of gas within the molten mass.

The accompanying drawings illustrate by way of example a number of constructional forms of a furnace according to the invention.

FIGURE 1 is a vertical section through a furnace according to the invention,

FIGURES 2 to 5 are horizontal sections through the crucible, showing various positions of the burners, FIGURES 6 and 7 are vertical sections through a portion of the crucible, also showing various positions of the burners, FIGURE 8 is a vertical section through a portion of the discharge channel and of the refining tank, showing the arrangement of the overflow, FIGURE 9 is a vertical section showing a movable overflow, and FIGURE 10 is a section along the line X—X of FIGURE 9.

Referring to FIGURE 1, the furnace 1 comprises essentially a shaft 2 constituting a heat exchange column joined by a flared portion or belly 3 to the crucible 4 containing the molten materials. The crucible 4 is joined to a second shaft 5 by a connection 6 constituting the discharge channel. The second shaft 5 leads into a refining tank 7, from which the worked product is discharge through an extraction orifice 8. The extraction of the product may be effected by overflow as indicated in FIGURE 1, but it may also be effected by drawing or extraction by a machine. The exchanger column 2 consists of walls 9 of refractory materials which are well insulated against cooling by the external atmosphere. It is closed at its upper end 10 by a top 11 provided with a flap valve 12. The downtake 13 commences below the upper portion 10. At its base, the column 2 flares into the form of a belly 3 which consists of a flared portion of the wall 9. The belly 3 constitutes the junction between the column 2 and the crucible 4. The latter in turn consists of an extension of the wall 9 of the column 2. The various parts of the furnace 1 are of either circular or polygonal, for example, square cross-section. If desired, the various parts may be given different cross-sections, for example the crucible 4 may be given a square cross-section, and the belly 3 and the column 2 a circular cross-section.

Disposed in the crucible 4 are one or more burners 14 which may be arranged in various forms, and some particularly advantageous arrangements of which are illustrated in FIGURES 2 to 7. In the arrangement of FIGURE 2, four burners are disposed facing one another in such manner that the currents produced by the two sets of burners meet one another and produce a considerable turbulence at the centre of the crucible. A similar arrangement is illustrated in FIGURE 3, in which a pair of opposite burners is disposed laterally in relation to a pair of parallel burners. In FIGURE 4, the burners 14 are distributed on the various walls and arranged close to one edge of the crucible, while in FIGURE 5 two burners are arranged facing one another, but obliquely in relation to the walls. The two latter configurations afford the advantage of producing in the crucible rotating currents. FIGURES 6 and 7 illustrate two other arrangements of the burners 14. These arrangements may naturally be combined with the arrangements according to FIGURES 2 to 5. In FIGURE 6, two burners 14 are illustrated at two different levels. The burners at the lower level is preferably disposed on the side of the connection 6 (FIGURE 1). The burners produce circulation currents indicated by the arrows 15 and 16. The lower burner recirculates the materials carried along in the direction of the arrows 16, which would otherwise pass directly to the connection 6. According to FIGURE 7, the burners 14 are downwardly inclined so as to produce the currents indicated by the arrows 15.

Referring again to FIGURE 1, the crucible 4 comprises in its lower portion an outlet 7 adjoining the connection 6 leading to the base of the second shaft 5 communicating with the refining tank 7. Below the outlet 17, the crucible 4 is extended by a dead-end 18 normally having the same cross-section as the crucible 4. Disposed in the dead-end 18 is a heating means 19, preferably consisting of electrodes or an electric resistor.

In order to describe the operation of the furnace, reference must be made successively to the circuits followed by the gases and the solid materials. The burners 14 fed with fuel and combustion air inject into the crucible 4 the mixture which burns in the molten products and induces therein the currents which have hereinbefore been described.

The burnt gases rise through the molten products and thereafter enter the belly 3 and the column 2 and finally escape through the downtake 13. The speed of the gases is locally reduced owing to the flare 3, so that the danger of entrainment of materials, either the solid materials descending in the column 2 or the molten materials carried by the gases, is thus reduced. More especially, the bath contained in the crucible is prevented from rising en masse under the thrust of a gas pocket which might form within the liquid mass. The belly 3 affords a possibility of expansion of the liquid mass.

The starting materials are introduced into the furnace through the upper end 10 and gradually become heated in descending in counter-current to the hot gases in the column 2 and the belly 3. The materials falling into the crucible 4 continue their melting and working therein, while the dense solid materials decant into the dead-end 18 out of the circuit of the products. The products leave the crucible 4 and enter the shaft 5 through the connection 6. In the shaft 5, the upward movement of the products assists the less dense solid materials in rising to the surface, whence they are removed by skimming. The level 20 of the products in the tank 7 determines the level 21 in the crucible 4. The position of these levels is adjusted by varying the speed of extraction of the molten materials.

The operation of the furnace is improved by making the level 21 independent of the level 20 by the provision of an overflow 22 (FIGURE 8), which completely obstructs the outlet from the second shaft 5. The said overflow consists of a wall of refractory materials which is disposed upon the base 23 of the refining tank 7 close to the shaft 5. The level 21 in the shafts 4 and 5 is then adjusted by the position of the upper edge 24 of the overflow 22.

FIGURES 9 and 10 illustrate another constructional form of the overflow 22, wherein the latter consists of a panel of refractory material of low density, which is displaceable. The overflow 22 slides in grooves 25 formed in the walls 26 of the shaft 5. The overflow 22 is maintained in position by locating blocks 27 which prevent the overflow 22 from rising owing to its density, which is lower than that of the molten product. The position of the level 21 of the product in the shaft 5 and in the crucible 4 is thus adjusted, the said level being independent of the level 20 in the refining tank 7. Consequently, the depth to which the burners 14 open below the level 21 of the molten products is varied by displacing the overflow 22 and securing the latter by means of the locating blocks 27.

Of course, the invention is not limited to the embodiments which have been described and illustrated by way of example, and modifications may be made thereto without departing from its scope.

I claim:

1. In a furnace for melting and working products such as glass having a crucible to contain melting and molten product, a vertical shaft above said crucible for introduction and preheating of raw material, a refining chamber, and a submerged duct connecting said crucible laterally to said chamber, the improvement in combination therewith of burner means adapted to inject burning gases into said crucible between the surface of said product and said duct sufficient to agitate a top zone of said product, said crucible having sufficient depth below said burner means to provide a calm molten zone below said top zone.

2. The furnace of claim 1 wherein said crucible is flared outwardly above said burner means.

3. The furnace of claim 1 wherein said crucible extends below said duct.

4. The furnace of claim 1 additionally comprising means to adjust the level of product in said crucible.

5. The furnace of claim 4 wherein said refining chamber is provided with a vertically adjustable overflow which controls said product level.

6. In a process for melting and working products such as glass in a shaft furnace having a crucible of molten and melting products and a refining chamber, said process including laterally injecting burning gases into said crucible, and removing molten glass from said crucible to said refining chamber through a channel below the molten surface thereof, the improvement in combination therewith comprising injecting at a position said burning gases at a sufficient rate and a sufficient distance below said surface to create a top melting zone of agitated product and at a sufficient distance above said channel to provide a bottom calm molten zone between said top agitated melting zone and said channel.

7. The process of claim 6 additionally comprising varying the level of said molten surface to vertically adjust the position of injecting said burning gases.

References Cited by the Examiner

UNITED STATES PATENTS

| 1,611,328 | 12/1926 | Arbogast | 65—335 X |
| 1,880,012 | 9/1932 | Brassert | 266—33 X |
| 2,283,163 | 5/1942 | Brassert et al. | 266—33 X |
| 2,634,555 | 4/1953 | Henry et al. | 65—135 |
| 2,677,003 | 4/1954 | Arbeit et al. | 65—346 |
| 2,773,111 | 12/1956 | Arbeit et al. | 65—136 X |

DONALL H. SYLVESTER, *Primary Examiner.*